United States Patent
Hirokane et al.

(10) Patent No.: US 7,183,362 B2
(45) Date of Patent: Feb. 27, 2007

(54) PROCESS FOR PRODUCING POLYESTER RESINS

(75) Inventors: Takeshi Hirokane, Kanagawa (JP);
Shojiro Kuwahara, Kanagawa (JP);
Tsuyoshi Ikeda, Kanagawa (JP);
Nobuya Saegusa, Kanagawa (JP);
Tomohito Oyama, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 10/998,058

(22) Filed: Nov. 29, 2004

(65) Prior Publication Data

US 2005/0176914 A1    Aug. 11, 2005

(30) Foreign Application Priority Data

Nov. 27, 2003 (JP) ............................. 2003-397465
Mar. 30, 2004 (JP) ............................. 2004-098220

(51) Int. Cl.
*C08F 20/00* (2006.01)
*C08G 59/00* (2006.01)
*C08G 63/66* (2006.01)

(52) U.S. Cl. .................. 525/444; 528/300; 528/302; 528/308; 528/308.6; 525/437; 524/406; 524/755; 524/765; 524/783; 524/791

(58) Field of Classification Search ................ 528/300, 528/302, 308, 308.6, 406; 525/437, 444; 524/755, 765, 783, 791

See application file for complete search history.

(56) References Cited

FOREIGN PATENT DOCUMENTS

| EP | 1 164 155 A1 | 12/2001 |
|---|---|---|
| EP | 1 310 516 A1 | 5/2003 |
| EP | 1 411 074 A1 | 4/2004 |
| WO | WO 95/21881 | 8/1995 |

OTHER PUBLICATIONS

European Search Report, for Application No. EP 04 10 5865, Feb. 21, 2005 (3 pp.).

*Primary Examiner*—Samuel A. Acquah
(74) *Attorney, Agent, or Firm*—Antonelli, Terry, Stout and Kraus, LLP.

(57) ABSTRACT

In the invention, a polyester resin comprising dicarboxylic acid constitutional units and diol constitutional units wherein 5 to 60 mol % of the diol constitutional units has a cyclic acetal skeleton is produced by a process comprising an oligomerization step and a polymerization step. In the oligomerization step, an ester having a limited acid value is transesterified with a diol having a cyclic acetal skeleton in the presence of a basic compound to obtain an oligomer. The oligomer is then polymerized in the subsequent polymerization step to increase the molecular weight.

14 Claims, No Drawings

PROCESS FOR PRODUCING POLYESTER RESINS

BACKGROUND OF THE INVENTION

1. Field of the Invention

The present invention relates to a process for producing polyester resins comprising dicarboxylic acid constitutional units and diol constitutional units, wherein 5 to 60 mol % of the diol constitutional units have a cyclic acetal skeleton.

2. Description of the Prior Art

Polyethylene terephthalate (hereinafter referred to as "PET") has been extensively used in various applications such as films, sheets and hollow containers because of its excellent transparency, mechanical properties, melt stability, solvent resistance, fragrance retention and recyclability. However, being not necessarily good in heat resistance, the modification of PET has been widely made by copolymerization.

It has been known that the heat resistance, adhesion property, flame retardancy, etc. of polymers can be improved by the modification with a compound having cyclic acetal skeleton. Such improvements are attributable to the rigid skeleton of cyclic acetal and acetal bond. Therefore, there have been proposed various modifications of polyester resins by copolymerizing a compound having a cyclic acetal skeleton.

For example, U.S. Pat. No. 2,945,008 teaches that PET modified with 3,9-bis(1,1-dimethyl-2-hydroxyethyl)-2,4,8,10-tetraoxaspiro[5.5]undecane exhibits a high glass transition point and is excellent in heat resistance. Japanese Patent No. 2971942 discloses a container excellent in transparency and heat resistance which is made of a copolyester comprising terephthalic acid, 1,4-butane diol and a glycol having a cyclic acetal skeleton and a production method thereof. Japanese Patent No. 1979830 discloses a polyester excellent in heat resistance and transparency which is produced using a diol having a cyclic acetal skeleton.

Regarding the adhesion property attributable to acetal bond, Japanese Patent Nos. 1843892, 1855226 and 1902128 and JP 4-88078 A disclose adhesives, adhesive compositions and coating agents which contain polyesters produced using a diol or dicarboxylic acid having a cyclic acetal skeleton.

As other polyesters produced using a dicarboxylic acid or diol having a cyclic acetal skeleton, there have been proposed a polyester combined yarn with different shrinkage (JP 3-130425 A), a modified polyester film (JP 8-104742 A), a biodegradable polyester (JP 9-40762 A), an electrostatic developing toner (Japanese Patent No. 1652382), and a flame retardant resin composition (JP 2000-344939 A).

Polyester resins are generally produced by a direct esterification method or a transesterification method. In the direct esterification method, a dicarboxylic acid is esterified into a bishydroxyalkyl dicarboxylate by an excess of diol, which ester is then polycondensed into polyester under reduced pressure. In the transesterification method, an ester produced from a dicarboxylic acid and a monohydric alcohol is transesterified into a bishydroxyalkyl dicarboxylate by an excess of diol, which ester is then polycondensed into polyester under reduced pressure. In the production of PET, the direct esterification method is industrially advantageous over the transesterification method because terephthalic acid is less expensive than dimethyl terephthalate. Since the esterification of a dicarboxylic acid with a diol needs no catalyst, a high-quality polyester resin containing a less amount of impurities such as catalyst residues is produced in the direct esterification method, this making the direct esterification method further advantageous over the transesterification method. In the esterification of a dicarboxylic acid with a diol, alcohol is by-produced in the transesterification method, whereas water is by-produced in the direct esterification method. Therefore, the direct esterification method puts a less load on the environment as compared to the transesterification method. For these reasons, at present, the direct esterification method has been predominantly used in the industrial production of PET.

However, it has been found that the production of a polyester resin containing diol constitutional units having a cyclic acetal skeleton (hereinafter referred to as "cyclic acetal diol-modified polyester resin") by a common direct esterification method involves some drawbacks. In such a production, the cyclic acetal skeleton is decomposed into three- and four-functional substances by the action of carboxyl groups present in the reaction system and the generated water to broaden the molecular weight distribution of resultant polyester resins or provide gelated products. Thus, the cyclic acetal diol-modified polyester resins produced by the direct esterification method are considerably poor in moldability, mechanical properties, etc. as compared to compositionally analogous polyester resins produced by the transesterification method.

Among the above patent documents related to cyclic acetal diol-modified polyester resins, only JP 3-130425 A describes the direct esterification method. However, actual production conditions and the ring opening of the cyclic acetal skeleton by the action of dicarboxylic acid are not disclosed therein.

Under recently increasing attraction to recycling of PET, especially chemical recycling thereof, many chemical recycling methods have been proposed (JP 2002-60543 A, JP 2002-60369 A and JP 2002-167469 A). The method for producing polyester resins using bis(β-hydroxyethyl) terephthalate (hereinafter occasionally referred to merely as "BHET") recovered from PET by chemical recycling method puts a light load on the environment and is industrially advantageous. Since substantially free from acid ends derived from the dicarboxylic acid, BHET is suitable as the raw material for the cyclic acetal diol-modified polyesters. However, none of the above patent documents discloses the method of producing the cyclic acetal diol-modified polyesters from a bishydroxyalkyl dicarboxylate, which is recovered by depolymerizing polyester resins, as the raw material.

The inventors found a process of producing cyclic acetal diol-modified polyester resins, comprising a step of esterifying a dicarboxylic acid into a bishydroxyalkyl dicarboxylate or its polymer by a diol having no cyclic acetal skeleton, a step for transesterifying the ester groups with a diol having a cyclic acetal skeleton, and a step for polycondensing the resultant ester. The inventors further found that, in the above process, it was important to control the carboxyl group concentration and the water content in the reaction system during the transesterification of the bishydroxyalkyl dicarboxylate or its polymer with the diol having a cyclic acetal skeleton, and found that, by such a control, the decomposition of the cyclic acetal skeleton and the change of the cyclic acetal diol into three- and four-functional substances was prevented and the polyester resins were stably produced without causing gelation and broadening the molecular weight distribution. On the basis of these findings, the inventors filed Japanese Patent Application No. 2003-320057 which also included a process of producing cyclic acetal diol-modified polyester resins wherein BHET putting a light load on the environment was used as the raw material.

However, it was found that the cyclic acetal diol-modified polyester resins produced by the method of Japanese Patent Application No. 2003-320057 is likely to reduce its molecular weight by the heat during the molding step, thereby corresponding resulting in a considerable reduction of various properties such as mechanical properties. Until now, there has been disclosed no industrially advantageous production method of the cyclic acetal diol-modified polyester resins which are prevented from being reduced in the molecular weight and properties by the heat during molding.

SUMMARY OF THE INVENTION

In view of the above circumstances, an object of the present invention is to provide an industrially advantageous process for stably producing polyester resins (cyclic acetal diol-modified polyester resins) which comprise dicarboxylic acid constitutional units and diol constitutional units wherein 5 to 60 mol % of the diol constitutional units have a cyclic acetal skeleton, and which are less reduced in their molecular weight and properties by the heat applied during their molding.

As a result of extensive researches in view of the above object, the inventors have found that the decomposition of the cyclic acetal skeleton during polymerization can be prevented to allow the stable production of the cyclic acetal diol-modified polyester resins with excellent properties without significantly broadening the molecular weight distribution of polyester resins and causing the gelation of polyester resins, by a production method comprising an oligomerization step for transesterifying a bishydroxyalkyl dicarboxylate and/or its polymer having a limited acid value with a diol A having a cyclic acetal skeleton in the presence of a basic compound E to produce an oligomer, and a polymerization step for polymerizing the oligomer to increase the molecular weight. The inventors have further found that the cyclic acetal diol-modified polyester resins produce by such a production method are less reduced in the molecular weight and properties by the heat applied during their molding. The present invention has been accomplished on the basis of these findings.

Thus, the present invention provides:

a process for producing a polyester resin comprising dicarboxylic acid constitutional units and diol constitutional units wherein 5 to 60 mol % of the diol constitutional units have a cyclic acetal skeleton, said process comprising:

an oligomerization step for transesterifying an ester D having an acid value of 30 µeq/g or lower represented by the formula 1:

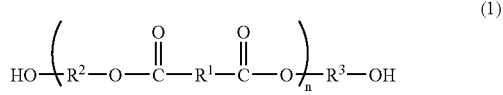

(1)

wherein $R^1$, $R^2$ and $R^3$ are each independently a hydrocarbon group selected from the group consisting of $C_1$ to $C_{10}$ aliphatic hydrocarbon groups, $C_3$ to $C_{10}$ alicyclic hydrocarbon groups and $C_6$ to $C_{10}$ aromatic hydrocarbon groups, and n is an integer of 1 to 200, with a diol A having a cyclic acetal skeleton in the presence of a basic compound E to produce an oligomer; and a polymerization step of polymerizing the oligomer to increase a molecular weight.

DETAILED DESCRIPTION OF THE INVENTION

The production method of the present invention is described in detail below.

The production methods of the present invention comprises an oligomerization step of transesterifying the ester D having a limited acid value with the diol A having a cyclic acetal skeleton in the presence of the basic compound E to produce an oligomer; and a polymerization step of polymerizing the oligomer to increase the molecular weight. The production process of the present invention may be carried out in known apparatuses which have been conventionally used for the production of polyester resins, without any modification.

The ester D is required to have an acid value of 30 µeq/g or lower. If exceeding 30 µeq/g, the diol A having a cyclic acetal skeleton is undesirably decomposed into three- and four-functional substances in the oligomerization step by the action of acid. The ester D may be either a monomer or a polymer as long as it has an acid value of 1 to 30 µeq/g. The average polymerization degree of the ester D is 1 or more but less than 200. The average polymerization degree referred to herein is determined by dividing a number-average molecular weight of the ester D as measured by gel permeation chromatography by the molecular weight of its repeating units.

The ester D is a bishydroxyalkyl ester of a dicarboxylic acid and/or its polymer, preferably a bishydroxyalkyl ester of an aromatic dicarboxylic acid and/or its polymer, and more preferably a bishydroxyalkyl ester of at least one dicarboxylic acid selected from the group consisting of terephthalic acid, isophthalic acid and 2,6-naphthalenedicarboxylic acid, and/or its polymer.

The ester D (ester D1, D2 or D3) may be produced by, for example, by the following methods 1 to 3, although not limited thereto.

In the method 1 for the production of ester D, a dicarboxylic acid B and a diol C having no cyclic acetal skeleton are subjected to esterification, and then the obtained ester is polycondensed into an ester D1 having an average polymerization degree of 15 to 200.

Examples of the dicarboxylic acid B usable in the method 1, but not particularly limited to, aliphatic dicarboxylic acids such as succinic acid, glutaric acid, adipic acid, pimelic acid, suberic acid, azelaic acid, sebacic acid, dodecanedicarboxylic acid, cyclohexanedicarboxylic acid, decanedicarboxylic acid, norbornanedicarboxylic acid, tricyclodecanedicarboxylic acid and pentacyclododecanedicarboxylic acid; and aromatic dicarboxylic acids such as terephthalic acid, isophthalic acid, phthalic acid, 2-methylterephthalic acid, 1,4-naphthalenedicarboxylic acid, 1,5-naphthalenedicarboxylic acid, 2,6-naphthalenedicarboxylic acid, 2,7-naphthalenedicarboxylic acid, biphenyldicarboxylic acid and tetralindicarboxylic acid, with the aromatic dicarboxylic acids being preferred in view of good mechanical properties and heat resistance of resultant polyester resin. More preferred are terephthalic acid, 2,6-naphthalenedicarboxylic acid and isophthalic acid, and still more preferred is terephthalic acid in view of economy. These dicarboxylic acids may be used singly or in combination of two or more. In addition, a monocarboxylic acid such as benzoic acid, propionic acid and butyric acid may be used in an amount not adversely affecting the effect of the invention.

Examples of the diol C usable in the method 1 include, but not particularly limited to, aliphatic diols such as ethylene glycol, trimethylene glycol, 1,4-butanediol, 1,5-pentanediol, 1,6-hexanediol, diethylene glycol, propylene glycol and neopentyl glycol; polyether diols such as polyethylene glycol, polypropylene glycol and polybutylene glycol; alicyclic diols such as 1,3-cyclohexane dimethanol, 1,4-cyclohexane dimethanol, 1,2-decahydronaphthalene dimethanol, 1,3-decahydronaphthalene dimethanol, 1,4-decahydronaphthalene dimethanol, 1,5-decahydronaphthalene dimethanol, 1,6-decahydronaphthalene dimethanol, 2,7-decahydronaphthalene dimethanol, tetralin dimethanol, norbornane dimethanol, tricyclodecane dimethanol and pentacyclododecane dimethanol; bisphenols such as 4,4'-(1-methylethylidene) bisphenol, methylene bisphenol (bisphenol F), 4,4'-cyclohexylidene bisphenol (bisphenol Z) and 4,4'-sulfonyl bisphenol (bisphenol S); alkyleneoxide adducts of the above bisphenols; aromatic dihydroxy compounds such as hydroquinone, resorcin, 4,4'-dihydroxybiphenyl, 4,4'-dihydroxydiphenyl ether and 4,4'-dihydroxydiphenyl benzophenone; and alkyleneoxide adducts of the above aromatic dihydroxy compounds, with ethylene glycol being preferred in view of good mechanical properties of resultant polyester resins and economy. These diols may be used singly or in combination of two or more.

In addition to the dicarboxylic acid B and the diol C, there may be used monohydric alcohols such as butyl alcohol, hexyl alcohol and octyl alcohol and tri or more valent alcohols such as trimethylol propane, glycerol and pentaerythritol, unless the effects of the present invention is adversely affected.

The method 1 may be performed in the same manner as in the esterification and polycondensation employed in the conventional production of polyester resins by a direct esterification method. Specifically, the charge molar ratio of the diol C to the dicarboxylic acid B is 1.01 to 10, preferably 1.1 to 5 and more preferably 1.15 to 2. Within the above range, undesired side reactions such as etherification of the diol C by dehydration are effectively prevented.

The esterification may be conducted under the same temperature and pressure conditions as in the esterification employed in the conventional production of polyester resins by a direct esterification method. Specifically, the esterification temperature is preferably 80 to 270° C., more preferably 100 to 260° C. and still more preferably 150 to 250° C., although not particularly limited thereto. The esterification pressure is preferably 10 to 500 kPa, although not particularly limited thereto. The esterification reaction is carried out while removing the water being generated out of the reaction system until the conversion to ester reaches preferably 90% or higher, more preferably 92% or higher and still more preferably 95% or higher when calculated from the amount of water removed. Although it is preferred to conduct the esterification in the absence of catalyst in view of good transparency and color tone of resultant polyester resins, the catalyst may be used in an amount of 0.0001 to 5 mol % of the dicarboxylic acid B. Any known catalyst can be used without any specific limitation, and examples thereof include metal compounds and metallic magnesium. The metal compounds are, for example, fatty acid salts, carbonates, phosphates, hydroxides, chlorides, oxides and alkoxides of metals such as zinc, lead, cerium, cadmium, manganese, cobalt, lithium, sodium, potassium, calcium, nickel, magnesium, vanadium, aluminum, titanium, germanium, antimony and tin. These catalysts may be used singly or in combination of two or more. Also, a known etherification inhibitor such as amine compounds and/or a known heat stabilizer such as phosphoric acid, phosphorous acid, phenylphosphonic acid, phosphoric esters and phosphorous esters may be used.

The polycondensation may be conducted under the same temperature and pressure conditions as in the polycondensation employed in the conventional production of polyester resins. The temperature is gradually raised until finally reaching preferably 200 to 300° C., and the pressure is gradually lowered until finally reaching preferably 10 kPa or lower. The polycondensation is conducted either in the absence of catalyst or in the presence of catalyst in an amount of 0.0001 to 5 mol % of the dicarboxylic acid B. Any known catalysts as describe above can be used singly or in combination of two or more, without any specific limitation. Preferred are compounds of metals such as aluminum, titanium, germanium, antimony and tin, and more preferred are alkoxides, oxides and carboxylates of titanium, alkoxides and oxides of germanium, and oxides of antimony.

The polycondensation is continued until the acid value of the ester D1 reaches 30 µeq/g or lower. If the acid value is 30 µeq/g or lower when the esterification is completed, it is no longer required to carry out the polycondensation.

In the method 2 for the production of ester D, the ester D2 is produced by depolymerizing a low polymer which is prepared by esterifying the dicarboxylic acid B with the diol C and/or a high polymer which is prepared by polycondensing the low polymer (hereinafter collectively referred to as ester D2') with the diol C until the average polymerization degree becomes less than 15 and the melting point becomes 240° C. or lower. The ester D2' is a precursor of the ester D2. As described above, the ester D2' may be either a low polymer prepared by the esterification step employed in known production method of polyester resin or a high polymer prepared by further polycondensing a low polymer obtained by the esterification step. Preferably, the ester D2' is prepared only by the esterification step in view of reducing the heat history, simplifying the process and saving the energy consumption. The low polymer referred to herein is a polymer which is produced only by the esterification step employed in known production method of polyester resin and its average polymerization degree is preferably 2 or more but less than 25, although not particularly limited thereto. The high polymer referred to herein is a polymer which is produced through the polycondensation and its average polymerization degree is preferably 10 or more but less than 200, although not particularly limited thereto. The average polymerization degree of the ester D2' is preferably 2 or more but less than 200, more preferably 2 or more but less than 70, still more preferably 2 or more but less than 25. The acid value of the ester D2' may be 30 µeq/g or larger.

The dicarboxylic acid B and the diol C as described above with respect to the method 1 may be used in the method 2 without any specific limitation.

In the depolymerization reaction, the ester D2' is reacted with the diol C in an amount of 0.1 to 10 mol, preferably 0.3 to 5 mol and more preferably 0.5 to 3 mol per one mole of the dicarboxylic acid constitutional units in the ester D2' at 150 to 250° C., preferably 180 to 230° C. under a pressure of 50 to 500 kPa, preferably 100 to 300 kPa. If the pressure is equal to the vapor pressure of diol C or lower, the decomposition is preferably conducted under reflux without removing the diol C out of the reaction system. By carrying out the depolymerization under the above conditions, undesired side reactions such as etherification of the diol C by dehydration are effectively prevented.

Although the depolymerization is conducted preferably in the absence of catalyst in view of good transparency and color tone of the resultant polyester resin, the catalyst may be used in an amount of 0.0001 to 5 mol % of the dicarboxylic acid constituting units in the ester D2'. The known catalysts as describe above with respect to the method 1 may be used alone or in combination of two or more, without any particular limitations.

The end carboxyl groups remaining slightly in the ester D2' is esterified simultaneously with the depolymerization of the ester D2'. Therefore, the acid value of the ester D2 obtained by the depolymerization is usually smaller than that of the ester D2' before the depolymerization. The acid value of the ester D2' can be effectively reduced by distilling off the water being released by the esterification during the depolymerization. Thus, by the method 2, the acid value of the ester D2 can be relatively easily regulated not only within 30 µeq/g or lower but also within 20 µeq/g or lower, and in some cases within 10 µeq/g or lower. The melting point of the ester D2' can be effectively reduced by the depolymerization. Thus, by the method 2, the melting point of the ester D2 can be relatively easily regulated not only within 240° C. or lower but also within 220° C. or lower, and in some cases within 210° C. or lower. When the melting point of the ester D2 is within the above range, the reaction temperature in the subsequent oligomerization step can be preferably reduced to 240° C. or lower to effectively prevent the diol A from being thermally decomposed in the oligomerization step. For these reasons, the ester D2 may be more suitable than the ester D1 as the ester D for use in the production method of the invention.

If the molar ratio of the diol constitutional units to the dicarboxylic acid constitutional units in the depolymerized product is larger than 3.0, mainly the diol C should be distilled off at 150 to 250° C. under a pressure of 0.5 to 100 kPa so as to reach a molar ratio of 3.0 or smaller at the completion of the depolymerization. If larger than 3.0, the diol C is easily etherified by dehydration, and the water released may decompose the cyclic acetal skeleton of diol A to form three- and four-functional substances in the subsequent oligomerization step. In addition, the by-produced ether may deteriorate the properties of final polyester resins. Even when the molar ratio is 3.0 or lower, mainly the diol C may be distilled off under the above conditions to further reduce the molar ratio.

The molar ratio of the diol constitutional units to the dicarboxylic acid constitutional units of the ester D2 thus produced is 1.1 to 3.0, preferably 1.1 to 2.0, more preferably 1.1 to 1.7, and still more preferably 1.1 to 1.5. By regulating the molar ratio of the ester D2 within the above range, undesired side reactions such as etherification by dehydration are effectively prevented in the subsequent oligomerization step.

In the method 3 for the production of ester D, a conventionally known polyester resin D3' in place of the ester D2' is depolymerized with the diol C in the same manner as in the method 2 until the average polymerization degree becomes less than 15 and the melting point becomes 240° C. or less.

Examples of the polyester resin D3' include, but not particularly limited to, polyethylene terephthalate, polybutylene terephthalate, polyethylene naphthalate, isophthalic acid-modified polyethylene terephthalate, polyethylene terephthalate modified by 1,4-cyclohexane dimethanol, polyethylene terephthalate modified by 3,9-bis(1,1-dimethyl-2-hydroxyethyl)-2,4,8,10-tetraoxaspiro[5.5]undecane and polyethylene terephthalate modified by 5-methylol-5-ethyl-2-(1,1-dimethyl-2-hydroxyethyl)-1,3-dioxane.

The acid value of the ester D3 may become smaller than that of the polyester resin D3' for the same reasons as described above, and can be regulated relatively easily within 30 µeq/g or lower, preferably within 20 µeq/g or lower and more preferably within 10 µeq/g or lower. Therefore, the decomposition of the cyclic acetal skeleton of diol A and the formation of three- and four-functional substances are preferably prevented in the subsequent oligomerization step. The melting point of the ester D3 can be regulated within 240° C. or lower, preferably within 220° C. or lower and more preferably within 210° C. or lower for the same reasons as described above. This allows the temperature of the subsequent oligomerization step to be reduced to 240° C. or lower. Therefore, the thermal decomposition of the diol A in the oligomerization step is effectively prevented.

The molar ratio of the diol constitutional units to the dicarboxylic acid constitutional units of the ester D3 is 1.1 to 3.0, preferably 1.1 to 2.0, more preferably 1.1 to 1.7 and still more preferably 1.1 to 1.5. By regulate the molar ratio within the above range, undesired side reactions such as etherification of diols by dehydration in the subsequent oligomerization step are effectively prevented.

In the methods 1 to 3, an orthoformic acid triester and/or a carbonic acid diester may be added, because the acid value of the ester D may be effectively reduced. Examples of the orthoformic acid triesters include trimethyl orthoformate and triethyl orthoformate. Examples of the carbonic acid diester include dimethyl carbonate and diethyl carbonate.

Bis(β-hydroxyethyl) terephthalate (ester D4) can be used as the ester D. The acid value of the ester D4 is 30 µeq/g or lower, preferably 20 µeq/g or lower and more preferably 10 µeq/g or lower. The method for preparing the ester D4 is not particularly limited, and the ester D4 is preferably prepared by chemical-recycling PET in view of reducing the load on the environments.

The ester D1 obtained by the method 1, the ester D2 obtained by the method 2, the ester D3 obtained by the method 3 and the ester D4 may be used as the ester D, singly or in combination of two or more in desired proportions.

In the oligomerization step of the process of the invention, the ester D is reacted with the diol A in the presence of the basic compound E to cause the transesterification mainly between the ester groups of ester D and the diol A, thereby producing an oligomer comprising the dicarboxylic acid constitutional units, the diol constitutional units having a cyclic acetal skeleton and the diol constitutional units having no cyclic acetal skeleton.

The diol A having a cyclic acetal skeleton is not particularly limited, and may be at least one compound selected from the group consisting of the diol compounds represented by the Formula 2:

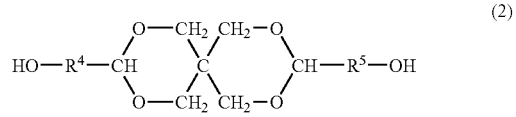

and the diol compounds represented by the following Formula 3:

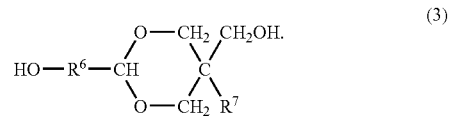

In the formulae 2 and 3, $R^4$ to $R^6$ are each independently a divalent hydrocarbon group selected from the group consisting of $C_1$ to $C_{10}$ aliphatic hydrocarbon groups, $C_3$ to $C_{10}$ alicyclic hydrocarbon groups and $C_6$ to $C_{10}$ aromatic hydrocarbon groups, preferably methylene, ethylene, propylene, butylene or structural isomers of thereof such as isopropylene and isobutylene; and $R^7$ is a monovalent hydrocarbon group selected from the group consisting of $C_1$ to $C_{10}$ aliphatic hydrocarbon groups, $C_3$ to $C_{10}$ alicyclic hydrocarbon groups and $C_6$ to $C_{10}$ aromatic hydrocarbon groups, preferably methyl, ethyl, propyl, butyl or structural isomers thereof such as isopropyl and isobutyl.

Specific examples of the diol A include 3,9-bis(1,1-dimethyl-2-hydroxyethyl)-2,4,8,10-tetraoxaspiro[5.5]undecane and 5-methylol-5-ethyl-2-(1,1-dimethyl-2-hydroxyethyl)-1,3-dioxane.

In the oligomerization step, the molar charge ratio of the diol A to the dicarboxylic acid constitutional units in the ester D is preferably 0.05 to 0.60. With a molar charge ratio within the above range, polyester resins having the diol constitutional units wherein 5 to 60 mol % thereof has a cyclic acetal skeleton are produced. Such polyester resins are excellent in properties such as transparency, mechanical properties and heat resistance. In view of attaining excellent properties, the molar charge ratio is preferably 0.10 to 0.55 and more preferably 0.20 to 0.45.

Since the acid value of the ester D used in the oligomerization step is 30 µeq/g or lower, the decomposition of the cyclic acetal skeleton of diol A into three- and four-functional substances due to the free carboxyl groups is prevented in the production of oligomer from the ester D and the diol A. This ensures the stable production of the polyester resins without causing gelation and significantly increasing the molecular weight distribution to allow resultant polyester resins to have excellent mechanical properties, moldability and fabricability. The acid value of the ester D is preferably 20 µeq/g or lower and more preferably 10 µeq/g or lower.

It is important for the process of the invention to conduct the oligomerization step in the presence of a specific amount of the basic compound E. The polyester resins produced by using such a specific amount of the basic compound E can be molded without causing a significant reduction of molecular weight to provide molded articles excellent in appearance and mechanical properties. The basic compound E is used in an amount of 0.0001 to 5 mol % of the dicarboxylic acid constitutional units in the ester D. If less than 0.0001 mol %, the cyclic acetal skeleton of the diol constitutional units is decomposed during the molding operation by the action of end acid groups in the polyester resins to considerably reduce the molecular weight and cause gelation, thereby deteriorating the mechanical properties of the polyester resins. If more than 5 mol %, the ester linkages are decomposed by an excessive amount of the remaining base during the molding operation to considerably reduce the molecular weight and cause gelation, thereby deteriorating the mechanical properties of the polyester resins. In addition, the remaining basic compound may precipitate in the polyester resins to deteriorate the mechanical properties and lessen the appearance by clouding, etc. Therefore, the amount of the basic compound E to be used is 0.0001 to 5 mol %, preferably 0.001 to 1 mol % and more preferably 0.01 to 0.5 mol %.

Examples of the basic compound E include, but not particularly limited to, carbonates, hydroxides, carboxylates, oxides, chlorides and alkoxides of alkali metals such as lithium, sodium and potassium; carbonates, hydroxides, carboxylates, oxides, chlorides and alkoxides of alkaline earth metals such as beryllium, magnesium and calcium; and amines such as trimethylamine and triethylamine, with the carbonates, hydroxides and carboxylates of alkali metals and the carbonates, hydroxides and carboxylates of alkaline earth metals being preferred, and the carboxylates of alkali metals being more preferred. The use of the carboxylates of alkali metals particularly improves thermal decomposition resistance and makes the transparency of polyester resins excellent. Examples of the carboxylates of alkali metals include formates, acetates, propionates, butyrates, isobutyrates, valerates, caproates, caprylates, caprinates, laurates, myristate, palmitates, stearates and benzoates of alkali metals, with the formates, acetates, propionates, butyrates, isobutyrates and benzoates of alkali metals being preferred, and potassium acetate, sodium acetate, lithium acetate, potassium propionate, sodium propionate and lithium propionate being more preferred. These basic compounds may be used singly or in combination of two or more.

Although the oligomerization step may be conducted in the absence of catalyst, the catalyst may be used in an amount of 0.0001 to 5 mol % of the dicarboxylic acid constitutional units in the ester D. Known catalysts, for example, those described above with respect to the method 1 may be used without specific limitations. Preferred are compounds of metals such as aluminum, titanium, germanium, antimony and tin, and more preferred are titanium compounds. Examples of the titanium compounds include, but not particularly limited to, tetra-n-propyl titanate, tetra-isopropyl titanate, tetra-n-butyl titanate, tetra-n-butyl titanate tetramer, tetra-t-butyl titanate, tetracyclohexyl titanate, tetraphenyl titanate, tetrabenzyl titanate, titanium acetate, titanium oxalate, titanium potassium oxalate, titanium sodium oxalate, potassium titanate and sodium titanate, with tetra-n-propyl titanate, tetra-isopropyl titanate and tetra-n-butyl titanate being preferred. These titanium compounds may be used singly or in combination of two or more. By using the titanium compound as the oligomerization catalyst, the transesterification reaction between the ester D and the diol A in the oligomerization step rapidly proceeds. Thus, the use of the titanium compound eliminates the problems caused by the low reaction rate of the transesterification between the ester D and the diol A, for example, the prolonged reaction time of the oligomerization step and the heat deterioration and discoloration of polyester resins due to the prolonged reaction time. If the diol A is sublimable, the low reaction rate of the transesterification between the ester D and the diol A may cause other problems in the production process and the quality of polyester resins. For example, the unreacted diol A not incorporated into the oligomer chains sublimates in the polycondensation step to clog vacuum lines or reduce the amount of the diol A constitutional units to be incorporated into the polymer chains. These problems can be also solved by the use of the titanium compound. In addition, since the titanium compound also acts as the polycondensation catalyst, the total amount of the catalyst to be used is reduced, ensuring the production of polyester resins with excellent transparency. The amount of the titanium compound to be used is preferably 0.001 to 0.5 mol % and more preferably 0.005 to 0.1 mol % based on the dicarboxylic acid constitutional units in the ester D.

The temperature of the oligomerization step is preferably 80 to 240° C., more preferably 100 to 235° C. and most preferably 150 to 230° C. When conducting under the above temperature condition, undesirable side reactions such as decomposition of the cyclic acetal skeleton of diol A and formation of three- and four-functional substances are effectively prevented. The pressure of the oligomerization step is preferably 10 to 500 kPa and more preferably 10 to 100 kPa. When conducing under the above pressure condition, the diol C being released by the transesterification between the ester D and the diol A is rapidly distilled out of the reaction system to promote the transesterification between the ester D and the diol A, this permitting the prevention of undesirable side reactions such as etherification of the diol C by dehydration and the rapid removal of the water being released in the etherification by dehydration.

In the oligomerization step, the diol C is distilled out of the reaction system until the total of the diol A constitutional units and the diol C constitutional units of the oligomer reaches preferably 1.05 to 2.0 mol, more preferably 1.05 to 1.5 mol and still more preferably 1.05 to 1.2 mol per one mole of the dicarboxylic acid constitutional units, because the transesterification between the ester D and the diol A is promoted and undesirable side reactions such as etherification of diol C by dehydration are prevented.

The oligomerization step is continued until the degree of transesterification reaction between the ester D and the diol A reaches 50 mol % or higher, preferably 70 mol % or higher and more preferably 90 mol % or higher. The termination of the oligomerization step is preferably determined according to the amount of the diol C distilled off because of its easiness. The oligomerization step is preferably completed within 5 h, more preferably within 3 h and still more preferably within 2 h, because undesirable side reactions such as decomposition of the cyclic acetal skeleton of diol A and formation of three- and four-functional substances are prevented.

When the water content in the reaction system is 0 to 0.5% by weight, the decomposition of diol A due to water is prevented in the oligomerization step. The water content is preferably 0 to 0.3% by weight and more preferably 0 to 0.1% by weight.

In the polymerization step of the invention, the oligomer produced in the oligomerization step is polycondensed under reduced pressure to increase the molecular weight. The polymerization step may be performed in the same manner as in the polycondensation step employed in the conventional methods for producing polyester resins. Specifically, the reaction pressure is gradually reduced until finally reaching about 0.1 to 300 Pa. If the final reaction pressure exceeds 300 Pa, a sufficiently high reaction rate of the polycondensation may be unfavorably not obtained. The temperature is gradually raised and the polycondensation reaction is preferably conducted at 190 to 300° C. If the polycondensation temperature exceeds 300° C., undesired side reactions such as heat decomposition of reactants tend to occur and the resultant polyester resins tends to be significantly yellowed. The completion of the polymerization step may be determined in the same manner as in the common methods for producing polyester resins, i.e., determined by whether the desired polymerization degree measured by melt viscosity is achieved. The melt viscosity is preferably measured by reading a torque applied to an agitator or a load current of a motor because of its easiness. The reaction time in the polymerization step is 6 h or less and preferably 4 h or less, because undesirable side reactions such as decomposition of the cyclic acetal skeleton of diol A and formation of three- and four-functional substances are prevented, and the color tone of resultant polyester resins is good.

The polymerization step is performed either in the absence of catalyst or in the presence of catalyst in an amount of 0.0001 to 5 mol % based on the dicarboxylic acid constitutional units in the oligomer. Known catalysts described above with respect to the method 1 are usable without any particular limitations. Preferred are compounds of metals such as aluminum, titanium, germanium, antimony and tin, and more preferred are alkoxides, oxides and carboxylates of titanium, alkoxides and oxides of germanium, and oxides of antimony. These catalysts may be used singly or in combination of two or more. In the case where the titanium compounds are used as the catalyst in the oligomerization step, a sufficient reaction rate of polymerization may be obtained without adding fresh catalyst. In addition, a large polymerization degree can be attained by the use of the titanium compounds as compared with the use of other catalysts, improving the mechanical strength, particularly impact resistance of polyester resins drastically as compared to using other catalyst.

In the process for production of polyester resins according to the present invention, known etherification inhibitors, stabilizers such as heat stabilizers and polymerization modifiers may be used. Examples of the etherification inhibitors include amine. Examples of the heat stabilizers include phosphoric acid, phosphorous acid, phenylphosphoric acid, phosphates and phosphites. Also usable are light stabilizers, antistatic agents, lubricants, antioxidants and mold release agents.

The polyester resins produced by the process of the invention have a molecular weight distribution (Mw/Mn) of preferably 2.5 to 12.0, more preferably 2.5 to 7.0 and still more preferably 2.5 to 5.0. With the molecular weight distribution within the above range, the polyester resins exhibit a good moldability.

The polyester resins produced by the process of the invention may be molded by known molding methods such as, but not particularly limited to, injection molding, extrusion, calendering, extrusion foaming, extrusion blow molding and injection blow molding.

The present invention will be described in more detail by reference to the following examples. However, it should be noted that the following examples are only illustrative and not intended to limit the invention thereto. The evaluation methods used herein are as follows.

Evaluation of Ester D (1) Acid Value

Into 50 ml of a mixed solvent, o-cresol/chloroform/1,1,2,2-tetrachloroethane=70/15/15 by mass, accurately weighed 1 g of ester D was dissolved. The solution was subjected to potentiometric titration with a 0.1 N ethanol solution of potassium hydroxide using an automatic titrator "COM-2000" available from Hiranuma Sangyo Co., Ltd.

(2) Average Polymerization Degree

Into 20 g of a mixed solvent, chloroform/1,1,1,3,3,3-hexafluoro-2-propanol=99/1 by mass, 2 mg of ester D was dissolved. The solution was subjected to gel permeation chromatography (GPC) and the results were calibrated by a standard polystyrene. The GPC was conducted using a GPC apparatus "TOSOH 8020" equipped with two "TSK GMHHR-L" columns and one "TSK G5000HR" column all available from Ibsoh Corporation at a column temperature of 40° C. A chloroform eluent was flowed through the columns at a rate of 1.0 mL/min and the detection was made by UV detector.

Evaluation of Reaction Mixture at Initiation of Oligomerization Step (1) Water Content The water in accurately weighed 0.1 g of a reaction mixture of the ester D and the diol A was vaporized by a water vaporizer at 235° C. under a nitrogen flow, and its amount was measured by a trace water analyzer "CA-05 Model" available from Mitsubishi Chemical Corp., under a nitrogen flow at a rate of 200 mL/min for 30 min.

Evaluation of Polyester Resin (1) Number-Average Molecular Weight and Molecular Weight Distribution (Mw/Mn)

A solution of 2 mg of polyester resin in 20 g of chloroform was subjected to gel permeation chromatography (GPC) and the results were calibrated by a standard polystyrene to obtain the number-average molecular weight Mn1 and the molecular weight distribution Mw/Mn. The GPC was conducted using a GPC apparatus "TOSOH 8020" equipped with two "TSK GMHHR-L" columns and one "TSK G5000HR" column all available from Tosoh Corporation at a column temperature of 40° C. A chloroform eluent was flowed through the columns at a rate of 1.0 mL/min and the detection was made by UV detector.

(2) Copolymerization Proportion of Diol A

A solution of 20 mg of polyester resin in 1 g of heavy chloroform was subjected to $^1$H-NMR analysis and the copolymerization proportion of diol A was calculated from the peak area ratio. The $^1$H-NMR analysis was conducted at 400 MHz using "NM-AL400" available from Nippon Denshi Co., Ltd.

(3) Evaluation of Degree of Thermal Decomposition

In a thermal analyzer "DTG-50" available from Shimadzu Corporation, 10 mg of polyester resin was heated to 240° C. at a temperature rise rate of 10° C./min under a nitrogen flow at a rate of 50 mL/min and maintained at 240° C. for 30 min. Thereafter, the number-average molecular weight Mn2 was measured by the method as described above. The degree of thermal decomposition was expressed by the value of (Mn1−Mn2)/Mn1 and rated as follows.

| Rating | (Mn1−Mn2)/Mn1 |
|---|---|
| Poor | 0.1 or more |
| Acceptable | 0.08 or more but less than 0.1 |
| Good | 0.06 or more but less than 0.08 |
| Excellent | less than 0.06 |

(4) Appearance of Molded Article

The polyester resin was molded into a disk having a thickness of 3.2 mm and a diameter of 100 mm using a screw injection-molding machine (screw diameter: 32 mm; mold clamping force: 9.8 kN) at a cylinder temperature of 240 to 280° C. and a mold temperature of 35° C. The molded disk was observed to examine the presence of gels.

EXAMPLES 1–4

The dicarboxylic acid B and the diol C having no cyclic acetal skeleton as shown in Table 1 were charged into a reactor and subjected to esterification by a common method. After completion of the esterification, the polycondensation was conducted by a common method in the presence of 0.01 mol % of antimony (III) oxide and 0.06 mol % of triethyl phosphate each based on the dicarboxylic acid constitutional units to obtain esters D1-1 to D1-4 (production method 1). The average polymerization degrees and acid values thereof are shown in Table 1.

The obtained ester was mixed with given amounts of the basic compound and the diol A having a cyclic acetal skeleton as shown in Table 1 and further with 0.01 mol % of tetra-n-butyl titanate based on the dicarboxylic acid constitutional units, and the transesterification was conducted at 225° C. under a pressure of 13.3 kPa for 3 h to obtain an oligomer. During the reaction, the diol C was distilled off out of the reaction system. The molar ratio, (diol A constitutional units+diol C constitutional units)/dicarboxylic acid constitutional units, which is expressed as "diol units/acid units" in tables, reached the value shown in Table 1 (oligomerization step).

The obtained oligomer was polycondensed while increasing the temperature and reducing the pressure, and finally at 270° C. under 133 Pa or lower. The polycondensation was terminated when the predetermined melt viscosity was reached to obtain a polyester resin (polymerization step).

The evaluation results of the polyester resins are shown in Table 1.

In the following tables, the following abbreviations are used:

Terephthalic acid: PTA; polyethylene terephthalate: PET; bis(β-hydroxyethyl) terephthalate: BHET; ethylene glycol: EG; 3,9-bis(1,1-dimethyl-2-hydroxyethyl)-2,4,8,10-tetraoxaspiro[5.5]undecane: SPG; 5-methylol-5-ethyl-2-(1,1-dimethyl-2-hydroxyethyl)-1,3-dioxane: DOG

TABLE 1

| | Examples | | | |
|---|---|---|---|---|
| | 1 | 2 | 3 | 4 |
| Charge | | | | |
| Dicarboxylic acid B PTA (mol) | 26.0 | 26.0 | 26.0 | 26.0 |
| Diol C EG (mol) | 31.2 | 39.0 | 52.0 | 104.1 |
| Ester D1 | D1-1 | D1-2 | D1-3 | D1-4 |
| average polymerization degree | 55 | 70 | 70 | 55 |
| acid value (μeq/g) | 18 | 16 | 15 | 18 |
| Oligomerization Step | | | | |
| Basic compound type | Sodium acetate | Potassium acetate | Potassium propionate | Potassium butyrate |
| amount (mol) | 0.065 | 0.520 | 0.130 | 0.260 |
| Diol A | | | | |
| SPG (mol) | 1.3 | 14.3 | 6.5 | — |
| DOG (mol) | — | — | — | 2.6 |
| diol units/acid units | 1.05 | 1.10 | 1.15 | 1.10 |
| water content (%) | 0.05 | 0.10 | 0.05 | 0.30 |
| Evaluation of Polyester Resin | | | | |
| Mn1 | 14500 | 14000 | 14500 | 14000 |
| Mw/Mn | 3.5 | 4.7 | 3.9 | 3.5 |
| proportion of copolymerization (mol %) | 5.0 | 54.6 | 24.9 | 10.0 |
| degree of thermal decomposition | Good | Good | Excellent | Good |
| appearance of injection-molded article | Good | Good | Good | Good |

EXAMPLES 5–8

The dicarboxylic acid B and the diol C as shown in Table 2 were charged into a reactor and subjected to esterification reaction by a common method. The ester was mixed with the diol C for depolymerization in an amount as shown in Table 2, and then depolymerized at 215° C. under atmospheric pressure. The depolymerization reaction was continued for 3 h while distilling off water being released, and then the diol C was distilled off at 215° C. under 13.3 kPa to obtain esters D2-1 to D2-4 (production method 2). The average polymerization degrees and acid values of the obtained esters are shown in Table 2.

As shown in Table 2, the obtained esters were subjected to the oligomerization and polymerization in the same manner as in Example 1, thereby obtaining polyester resins.

The evaluation results of the polyester resins are shown in Table 2.

TABLE 2

|  | Examples | | | |
|---|---|---|---|---|
|  | 5 | 6 | 7 | 8 |
| Charge |  |  |  |  |
| Dicarboxylic acid B PTA (mol) | 26.0 | 26.0 | 26.0 | 26.0 |
| Diol C EG (mol) | 31.2 | 31.2 | 31.2 | 31.2 |
| Diol C for depolymerization EG (mol) | 26.0 | 33.8 | 20.8 | 46.8 |
| Ester D2 | D2-1 | D2-2 | D2-3 | D2-4 |
| average polymerization degree | 4 | 6 | 10 | 3 |
| acid value (μeq/g) | 8 | 6 | 5 | 9 |
| Oligomerization Step |  |  |  |  |
| Potassium acetate (mol) | 0.039 | 0.052 | 0.130 | 0.065 |
| Diol A |  |  |  |  |
| SPG (mol) | 1.3 | 14.3 | 6.5 | — |
| DOG (mol) | — | — | — | 2.6 |
| diol units/acid units | 1.45 | 1.40 | 1.60 | 1.55 |
| water content (%) | 0.05 | 0.05 | 0.05 | 0.05 |
| Evaluation of Polyester Resin |  |  |  |  |
| Mn1 | 15500 | 14500 | 15500 | 16000 |
| Mw/Mn | 2.7 | 3.4 | 3.2 | 3.0 |
| proportion of copolymerization (mol %) | 5.0 | 54.6 | 24.9 | 10.0 |
| degree of thermal decomposition | Excellent | Excellent | Excellent | Excellent |
| appearance of injection-molded article | Good | Good | Good | Good |

EXAMPLES 9–12

The esters D1-1 to D1-4 obtained in Examples 1 to 4 were respectively mixed with the diol C for depolymerization in an amount as shown in Table 3, 5 and then depolymerized at 215° C. under atmospheric pressure. The depolymerization was continued for 3 h while distilling off water being released, and then the diol C was distilled off at 215° C. under 13.3 kPa to obtain esters D2-5 to D2-8 (production method 2). The average polymerization degrees and acid values of the obtained esters are shown in Table 3.

As shown in Table 3, the obtained esters were subjected to the oligomerization and polymerization in the same manner as in Example 1, thereby obtaining polyester resins.

The evaluation results of the polyester resins are shown in Table 3.

TABLE 3

|  | Examples | | | |
|---|---|---|---|---|
|  | 9 | 10 | 11 | 12 |
| Charge |  |  |  |  |
| Ester D1 | D1-1 | D1-2 | D1-3 | D1-4 |
| Diol C for depolymerization EG (mol) | 26.0 | 39.0 | 31.2 | 52.0 |
| Ester D2 | D2-5 | D2-6 | D2-7 | D2-8 |
| average polymerization degree | 10 | 12 | 3 | 8 |
| acid value (μeq/g) | 5 | 5 | 8 | 6 |
| Oligomerization Step |  |  |  |  |
| Potassium acetate (mol) | 0.065 | 0.098 | 0.130 | 0.260 |
| Diol A |  |  |  |  |
| SPG (mol) | 1.3 | 14.3 | 6.5 | — |
| DOG (mol) | — | — | — | 2.6 |
| diol units/acid units | 1.30 | 1.40 | 1.45 | 1.35 |
| water content (%) | 0.05 | 0.10 | 0.05 | 0.10 |
| Evaluation of Polyester Resin |  |  |  |  |
| Mn1 | 16500 | 16000 | 15000 | 16500 |
| Mw/Mn | 2.8 | 3.2 | 2.7 | 2.8 |
| proportion of copolymerization (mol %) | 5.0 | 54.5 | 25.0 | 10.0 |
| degree of thermal decomposition | Excellent | Excellent | Excellent | Excellent |
| appearance of injection-molded article | Good | Good | Good | Good |

EXAMPLES 13 AND 14

The polyethylene terephthalate "RT543C" available from Nippon Unipet Co., Ltd., as shown in Table 4 was used as the ester D. The ester D was mixed with the diol C for depolymerization in an amount as shown in Table 4, and then depolymerized by the same method as in Example 9 to obtain esters D3-1 and D3-2 (production method 3). The average polymerization degrees and acid values of the obtained esters are shown in Table 4.

As shown in Table 4, the obtained esters were subjected to the oligomerization and polymerization in the same manner as in Example 1, thereby obtaining polyester resins.

The evaluation results of the polyester resins are shown in Table 4.

EXAMPLES 15 AND 16

Bis(β-hydroxyethyl) terephthalate (ester D4) available from Kanto Chemical Co., Ltd. as shown in Table 4 was used as the ester D, and subjected to oligomerization and polymerization in the same manner as in Example 1, thereby obtaining polyester resins. The evaluation results of the polyester resins are shown in Table 4.

TABLE 4

| | Examples | | | |
|---|---|---|---|---|
| | 13 | 14 | 15 | 16 |
| Charged | | | | |
| Ester D PET (mol) | 26.0 | 26.0 | — | — |
| Diol C for depolymerization EG (mol) | 26.0 | 39.0 | — | — |
| Ester D3 | D3-1 | D3-2 | — | — |
| average polymerization degree | 4 | 8 | — | — |
| acid value (μeq/g) | 8 | 5 | — | — |
| Ester D4 BHET (mol) | — | — | 26.0 | 26.0 |
| Oligomerization Step | | | | |
| Potassium acetate (mol) | 0.052 | 0.026 | 0.026 | 0.052 |
| Diol A SPG (mol) | 1.3 | 14.3 | 1.3 | 14.3 |
| diol units/acid units | 1.75 | 1.40 | 1.90 | 1.40 |
| water content (%) | 0.05 | 0.05 | 0.03 | 0.03 |
| Evaluation of Polyester Resin | | | | |
| Mn1 | 15500 | 15000 | 15500 | 15000 |
| Mw/Mn | 2.8 | 3.5 | 2.8 | 3.6 |
| proportion of copolymerization (mol %) | 5.0 | 54.6 | 5.0 | 54.7 |
| degree of thermal decomposition | Good | Excellent | Good | Excellent |
| appearance of injection-molded article | Good | Good | Good | Good |

EXAMPLES 17 AND 18

A mixture of the ester D1, ester D2, ester D3 and the ester D4 in a mixing ratio as shown in Table 5 was used as the ester D, and subjected to oligomerization and polymerization in the same manner as in Example 1, thereby obtaining polyester resins. The evaluation results of the polyester resins are shown in Table 5.

TABLE 5

| | Examples | |
|---|---|---|
| | 17 | 18 |
| Ester D1 | D1-1 | D1-2 |
| Ester D2 | D2-1 | D2-2 |
| Ester D3 | D3-1 | D3-2 |
| Mixing ratio (by mole) | | |
| D1/D2/D3/D4 | 1/1/1/1 | 1/3/3/3 |
| Ester D | | |
| PTA constitutional units (mole) | 26.0 | 26.0 |
| acid value (μeq/g) | 11 | 7 |
| Oligomerization Step | | |
| Potassium acetate (mol) | 0.026 | 0.052 |
| Diol A SPG (mol) | 1.3 | 14.3 |
| diol units/acid units | 1.50 | 1.35 |
| water content (%) | 0.03 | 0.03 |
| Evaluation of Polyester Resin | | |
| Mn1 | 14500 | 13500 |
| Mw/Mn | 2.8 | 3.6 |
| proportion of copolymerization (mol %) | 5.0 | 54.5 |
| degree of thermal decomposition | Good | Good |
| appearance of injection-molded article | Good | Good |

COMPARATIVE EXAMPLES 1–4

The oligomerization and polymerization were performed by the same method as in Example 2 except for using the ester D and omitting the use of potassium acetate as shown in Table 6, thereby obtaining polyester resins.

The evaluation results of the polyester resins are shown in Table 6.

TABLE 6

| | Comparative Examples | | | |
|---|---|---|---|---|
| | 1 | 2 | 3 | 4 |
| Ester D | D1-3 | D2-3 | D3-2 | D4 |
| PTA constitutional units (mole) | 26.0 | 26.0 | 26.0 | 26.0 |
| Oligomerization Step | | | | |
| Diol A SPG (mol) | 6.5 | 6.5 | 6.5 | 6.5 |
| Potassium acetate (mol) | 0.000 | 0.000 | 0.000 | 0.000 |
| diol units/acid units | 1.40 | 1.40 | 1.40 | 1.40 |
| water content (%) | 0.10 | 0.03 | 0.03 | 0.03 |
| Evaluation of Polyester Resin | | | | |
| Mn 1 | 14000 | 14500 | 14500 | 14500 |
| Mw/Mn | 4.2 | 3.5 | 3.7 | 3.9 |
| proportion of copolymerization (mol %) | 24.9 | 24.9 | 24.9 | 24.9 |
| degree of thermal decomposition | Poor | Poor | Poor | Poor |
| appearance of injection-molded article | Good | Good | Good | Good |

In the process of the present invention, polyester resins comprising dicarboxylic acid constitutional units and diol constitutional units containing units having a cyclic acetal skeleton which exhibit a low degree of thermal decomposition are stably produced by an industrially useful method with a less load on the environment as compared to the conventional transesterification methods. Therefore, the present invention has a large industrial value.

What is claimed is:

1. A process for producing a polyester resin comprising dicarboxylic acid constitutional units and diol constitutional units wherein 5 to 60 mol % of the diol constitutional units have a cyclic acetal skeleton, said process comprising:
   an oligomerization step for transesterifying an ester D having an acid value of 30 μeq/g or lower represented by the formula 1:

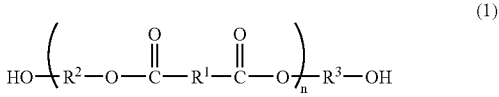

(1)

wherein $R^1$, $R^2$ and $R^3$ are each independently a hydrocarbon group selected from the group consisting of $C_1$ to $C_{10}$ aliphatic hydrocarbon groups, $C_3$ to $C_{10}$ alicyclic hydrocarbon groups and $C_6$ to $C_{10}$ aromatic hydrocarbon groups, and n is an integer of 1 to 200, with a diol A having a cyclic acetal skeleton in the presence of a basic compound E to produce an oligomer; and a polymerization step of polymerizing the oligomer to increase a molecular weight, wherein the basic compound E is at least one compound selected from the group consisting of carbonates, hydroxides and carboxylates of alkali metals and carbonates, hydroxides and carboxylates of alkaline earth metals.

2. The process according to claim 1, wherein said ester D is a bishydroxyalkyl dicarboxylate and/or its polymer.

3. The process according to claim 1, wherein said ester D is a bishydroxyalkyl ester of at least one dicarboxylic acid selected from the group consisting of terephthalic acid, isophthalic acid and 2,6-naphthalenedicarboxylic acid, and/or its polymer.

4. The process according to claim 1, wherein said ester D is a polymer of a bishydroxyalkyl dicarboxylate having an average polymerization degree of 15 to 200, which is produced by esterifying a dicarboxylic acid B with a diol C having no cyclic acetal skeleton and then subjecting to polycondensation reaction.

5. The process according to claim 1, wherein said ester D is a polymer of a bishydroxyalkyl dicarboxylate having an average polymerization degree of less than 15 and a melting point of 240° C. or less, said polymer being produced by depolymerizing a low polymer which is prepared by esterifying a dicarboxylic acid B with a diol C having no cyclic acetal skeleton and/or a high polymer which is prepared by polycondensing the low polymer with the diol C having no cyclic acetal skeleton.

6. The process according to claim 1, wherein said ester D is a polymer of a bishydroxyalkyl dicarboxylate having an average polymerization degree of less than 15 and a melting point of 240° C. or lower, said polymer being produced by depolymerizing at least one polyester resin selected from the group consisting of polyethylene terephthalate, polybutylene terephthalate, polyethylene naphthalate, polyethylene terephthalate modified with isophthalic acid, polyethylene terephthalate modified with 1,4-cyclohexanedimethanol, polyethylene terephthalate modified with 3,9-bis(1,1-dimethyl-2-hydroxyethyl)-2,4,8,10-tetraoxaspiro[5.5]undecane and polyethylene terephthalate modified with 5-methylol-5-ethyl-2-(1,1-dimethyl-2-hydroxyethyl)-1,3-dioxane with a diol C having no cyclic acetal skeleton.

7. The process according to claim 1, wherein said ester D is bis(β-hydroxyethyl) terephthalate.

8. The process according to claim 1, wherein said diol A is at least one compound selected from the group consisting of compounds represented by the formula 2:

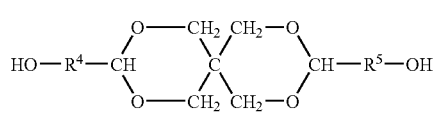

wherein $R^4$ and $R^5$ are each independently a hydrocarbon group selected from the group consisting of $C_1$ to $C_{10}$ aliphatic hydrocarbon groups, $C_3$ to $C_{10}$ alicyclic hydrocarbon groups and $C_6$ to $C_{10}$ aromatic hydrocarbon groups, and compounds represented by the formula 3:

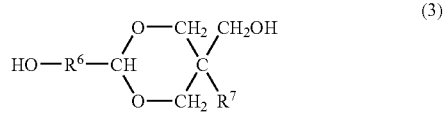

wherein $R^6$ and $R^7$ are each independently a hydrocarbon group selected from the group consisting of $C_1$ to $C_{10}$ aliphatic hydrocarbon groups, $C_3$ to $C_{10}$ alicyclic hydrocarbon groups and $C_6$ to $C_{10}$ aromatic hydrocarbon groups.

9. The process according to claim 1, wherein said diol A is at least one compound selected from the group consisting of 3,9-bis(1,1-dimethyl-2-hydroxyethyl)-2,4,8,10-tetraoxaspirol[5.5]undecane and 5-methylol-5-ethyl-2-(1,1-dimethyl-2-hydroxyethyl)-1,3-dioxane.

10. The process according to claim 1, wherein the oligomerization step is conducted in the presence of the basic compound E in an amount of 0.0001 to 5 mol % based on the dicarboxylic acid constitutional units in the ester D.

11. The process according to claim 1, wherein the oligomerization step is catalyzed by a titanium compound in an amount of 0.0001 to 5 mol % based on the dicarboxylic acid constitutional units in the ester D.

12. The process according to claim 1, wherein a water content in a reaction mixture of the oligomerization step is 0.5% by weight or lower.

13. A process for producing a polyester resin comprising dicarboxylic acid constitutional units and diol constitutional units wherein 5 to 60 mol % of the diol constitutional units have a cyclic acetal skeleton, said process comprising:

an oligomerization step for transesterifying an ester D having an acid value of 30 μeq/g or lower represented by the formula 1:

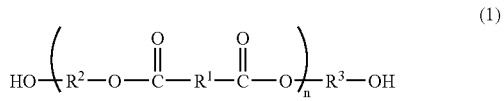

wherein $R^1$, $R^2$ and $B^3$ are each independently a hydrocarbon group selected from the group consisting of $C_1$ to $C_{10}$ aliphatic hydrocarbon groups, $C_3$ to $C_{10}$ alicyclic hydrocarbon groups and $C_6$ to $C_{10}$ aromatic hydrocarbon groups, and n is an integer of 1 to 200,
with a diol A having a cyclic acetal skeleton in the presence of a basic compound E to produce an oligomer; and a polymerization step of polymerizing the oligomer to increase a molecular weight.

14. The process according to claim 13 wherein the basic compound E is at least one compound selected from the group consisting of formates, acetates, propionates, butyrates, isobutyrates and benzoates of alkali metals.

* * * * *